United States Patent [19]
Durrer
[11] 4,061,436
[45] Dec. 6, 1977

[54] BANKNOTE INVALIDATING MACHINE

[75] Inventor: Franz Durrer, Kussnacht, Switzerland

[73] Assignee: Compagnie Industrielle Radioelectrique, Switzerland

[21] Appl. No.: 728,605

[22] Filed: Oct. 1, 1976

[30] Foreign Application Priority Data

Oct. 3, 1975 Switzerland ........................ 12843/75

[51] Int. Cl.[2] ........................ B23B 39/00; B26D 7/06
[52] U.S. Cl. ........................................ 408/3; 83/29; 83/925 R; 408/88; 408/98
[58] Field of Search ...................... 408/3, 103, 72, 88, 408/95, 98; 83/29, 925 R

[56] References Cited

U.S. PATENT DOCUMENTS

| | | | |
|---|---|---|---|
| 2,816,465 | 12/1957 | Honnef | 408/3 |
| 3,180,183 | 4/1965 | Stanley et al. | 408/88 |
| 3,230,797 | 1/1966 | Murschel | 408/95 |
| 3,238,624 | 3/1966 | McCabe | 408/3 |
| 3,266,343 | 8/1966 | Jellig | 408/3 |
| 3,546,978 | 12/1970 | Keown | 408/3 |
| 3,663,114 | 5/1972 | Welsh et al. | 408/3 |

*Primary Examiner*—Harrison L. Hinson
*Attorney, Agent, or Firm*—Robert E. Burns; Emmanuel J. Lobato; Bruce L. Adams

[57] ABSTRACT

A banknote invalidating machine comprises an interchangeable plate for receiving a pile of banknotes of given format, a press which compresses the pile of notes, and a perforating tool which is moved by a sequential control to perforate the compressed pile of notes at given locations.

4 Claims, 3 Drawing Figures

BANKNOTE INVALIDATING MACHINE

BACKGROUND OF THE INVENTION

The invention relates to the invalidation of banknotes.

Used banknotes are usually destroyed by burning. To avoid any possibility of fraud, the notes are firstly counted and arranged into a pile and the piled notes are invalidated by perforating them at determined locations corresponding to the indications of serials and note numbers, then the pile of invalidated notes is recounted before burning them. Any theft of a note is thus made impossible.

The invalidating perforation is usually carried out manually using a perforator, but this is long, fastidious and requires of the person entrusted with this work a great physical effort.

The invention aims to provide a machine for invalidating a pile of banknotes which obviates the cited drawbacks of manual invalidation and enables a semi-automatic perforation of a pile of any number of banknotes.

SUMMARY OF THE INVENTION

According to the invention, a banknote invalidating machine comprises a frame having means for receiving and positioning a pile of banknotes, a press arranged to compress a pile of banknotes positioned in said receiving means, a perforating tool, and means for relatively moving said tool and a pile of banknotes held compressed in said receiving means to perforate said pile.

BRIEF DESCRIPTION OF THE DRAWINGS

The accompanying drawings show, by way of example, an embodiment of the invention. In the drawings.

DESCRIPTION OF THE PREFERRED EMBODIMENT

Figure 1:
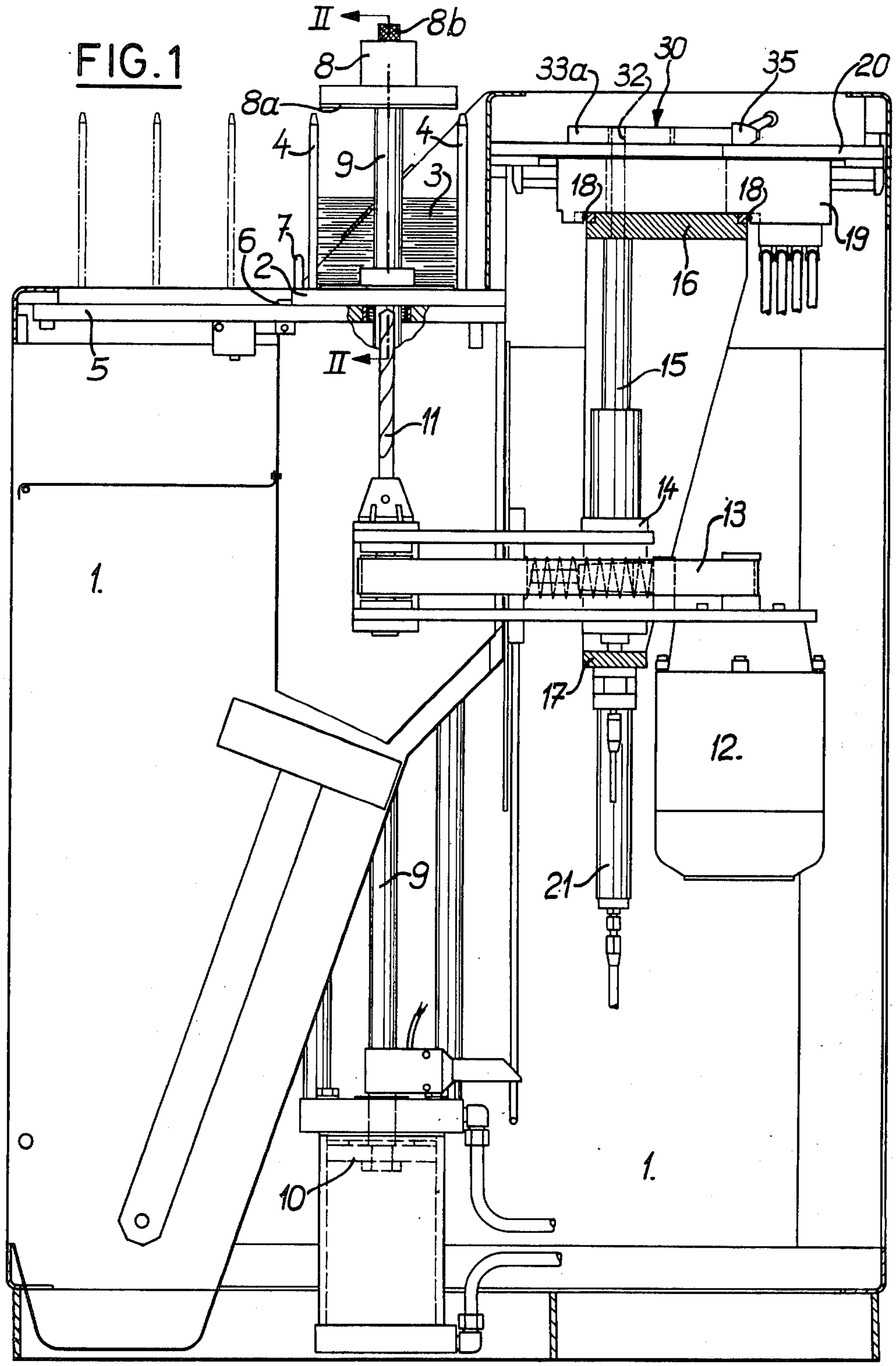
FIG. 1 is a side view, with partial cross-sections, of a banknote invalidating machine according to the invention.
Figure 2:
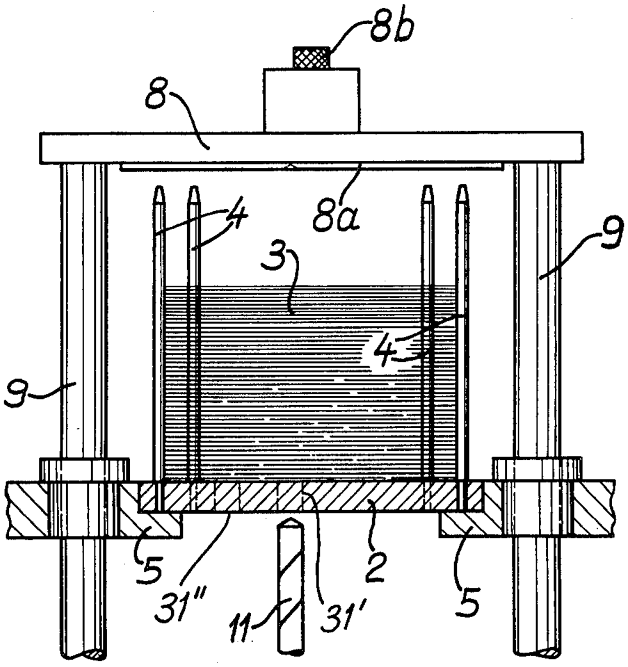
FIG. 2 is a view in partial cross-section along line II—II of FIG. 1 of a detail of this machine.

The machine shown includes a frame 1 on which is mounted a removable plate 2 for receiving and positioning a pile 3 of banknotes. As shown in FIGS. 1 and 2, each banknote is received and supported on the plate and held parallel to the plate. Plate 2 carries upstanding rods 4 defining the space occupied by the pile of notes 3. The plate is slidably mounted on two horizontal slideways 5 and may occupy two positions, a working position shown in full lines in FIG. 1, and a loading position shown in chain lines in the same Figure. A stop stud 6, retractable by means of lever 7, locks the plate 2 in the working position.

A press head 8 guided and driven by two columns 9 under the action of a dual-action jack 10 enables the pile of notes 3 (when the plate 2 is in the working position) to be compressed to compact it and hence avoid any movement of the notes during subsequent piercing. Head 8 has an interchangeable sole **8*a* secured on an underneath face of the head 8 by a knurled screw 8*b*, in a position parallel to plate 2**, as shown.

A mobile support unit 14 slidable vertically on two columns 15 carries a perforating tool 11, its motor 12 and a toothed transmission belt 13. The columns 15 are mounted on a mobile support 16, 17. Part 16 of the mobile support 16/17 is mounted, for sliding movement perpendicular to the plane of FIG. 1, by means of a ball race 18 on a second mobile support 19 which is movable, in the plane of FIG. 1, relative to a table 20 fixed on frame 1. These two mobile supports 16/17 and 19 thus cross at 90° and their positions define the position, in plan, of the tool 11 relative to the frame. Each of these two supports is associated with a dual action jack (not shown) by which it may be driven in both of its directions of sliding.

The mobile unit 14 carrying tool 11 can be moved vertically on the columns 15 by a dual action jack 21. The vertical displacement of the tool 11 is limited by the press head 8 whose position depends on the thickness of the pile of notes 3; this limitation may for example be controlled by a microswitch (not shown) fixed on the unit 14 cooperating with a stop fixed on one of the columns 9.

Figure 3:
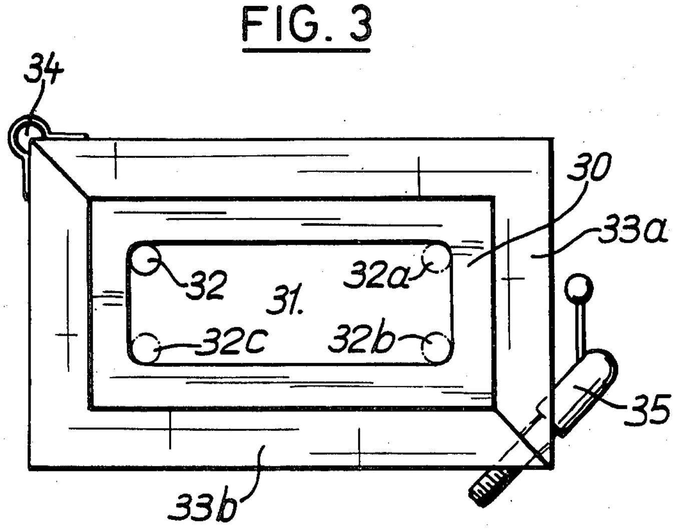
FIG. 3 is a plan view of another detail of this machine.

To control the displacement, in plan, of the mobile support 16/17 in order to position the tool 11 facing the previewed perforation locations 31', 31'' of the notes, shown in FIG. 2, there is provided, on the table 20, an interchangeable jig 30 provided with a calibrated opening 31 in which a positioning finger 32, fixed with support 16, can move, see FIG. 3. This interchangeable jig 30 is held in a two-part frame **33*a*, 33*b*, articulated at 34, one part of which is fixed on the table 20, the jig 30 being clamped by means of screw 35**.

Means are provided for sequentially controlling the jacks actuating the two mobile supports 16/17 and 19 so that finger 32 can successively occupy the positions 32, **32*a*, 32*b* and 32*c* defined by the four angles of the calibrated opening 31 of jig 30, these positions corresponding to locations where the perforating tool 11 should pierce the notes of pile 3**.

The plate 2 (with its rods 4), jig 30 and sole **8*a*** form a set of removable elements for a single type of note, and several such interchangeable sets will be provided, one for each type of banknote to be invalidated, i.e. according to the format of the notes and the locations to be perforated.

Operation of the machine is as follows: the set of removable elements corresponding to the type of notes to be invalidated (plate 2, jig 30, sole **8*a*) is chosen. The plate 2 with rods 4 is placed in the loading position on the slideways 5 and a pile of notes 3 to be invalidated is then placed between the rods 4. Jig 30 is fixed in frame 33*a*, 33*b* and the sole 8*a* is fixed on the press head 8. The plate 2 carrying pile 3 is pushed under the press head 8 until it is locked in the working position by stop stud 6**. Then the machine is started, this preferably involving the manipulation of two switches requiring the use of the user's two hands so as to avoid any accident.

As soon as the machine is started up, the two columns 9, under the action of jack 10, move the press head 8 down to compress and hence compact the pile of notes 3. Simultaneously, the finger 32 is brought to the first angle of jig 30 and motor 12 is started. The jack 21 then raises the mobile unit 14 and tool 11 perforates the pile of notes 3 at the previewed location. As mentioned previously, the vertical displacement of tool 11 is limited by the position of the press head 8 given by the thickness of the pile of notes 3. Once the upper position of tool 11 has been reached, the jack 21 lowers unit 14 and tool 11. The sequential control means then move the finger 32 to 32*a*, raise the tool 11 in this position to make a second perforation, then lower the unit 14, move finger 32 to 32*b* to make a third perforation and so on up to the fourth perforation. When the four perforations have been made, the machine stops in the position shown in FIG. 1. By means of lever 7, the plate 2 is then unlocked, pulled out to the loading position and the pile of invalidated notes removed.

The machine is then ready to receive a new pile of notes of the same type. If the next pile is of notes of another type, the set of removable elements is exchanged for that corresponding to the new pile of notes.

In the example given above, the machine includes hydraulic jacks controlled sequentially by an automatic device comprising relays and electrovalves. Positioning of the tool 11 is provided mechanically by a jig and a positioning finger.

The jacks could, however, be controlled by an electronic device, positioning of the tool being obtained by a perforated card controlling movement of the mobile support 16/17, this perforated card carrying, in code, a sequential program controlling the previously described operations.

As a variation, the sequential program could be carried by a magnetic card or band read by a suitable reader.

The sequential control of the machine could also be carried out by a programmed "dead" memory device acting either on a microprocessor (software), or on a cabled electronic control (hardware).

The sequential control can also be obtained with a drawn or printed jig read by an optical device electronically delivering orders for moving the note-invalidating tool.

With any of the described sequential control devices, the choice of a program for displacement of the tool may be made automatically by delivering data in response to placing of the support plate carrying the pile of notes to be invalidated. For this purpose, this support plate may have program-selection means controlling the mechanical displacement required for invalidating the notes. The control program would be stored in the machine and formed either on a perforated card, on magnetic means, by optical means cooperating with a jig, or by a programmed memory, as previously described.

In the illustrated embodiment, the tool 11 invalidating the notes is a drill bit. As a variation, this tool could be a toothed chain analogous to those employed in wood mortising machines.

The invalidation may be provided by milling or boring complex figures, either straight (slots) or shaped.

In another variation, a laser could be used for perforating the pile of notes.

One can see from this description the simplicity and security of the described machine, which enables the automatic invalidation of piles of notes of any value and thickness.

What is claimed is:

1. A banknote invalidating machine, comprising; a frame; a horizontal plate slidably mounted on the frame for receiving and supporting and for slidably positioning thereby on the frame a pile of banknotes, each parallel to the plate; means on the plate defining a space to be occupied thereon by the pile of banknotes; a press on the frame for compressing the pile of banknotes occupying said space, the slidable mounting of the plate being effective to slide the plate from a loading position thereof for receiving the pile of banknotes to a working position for the compressing of the pile and back to the loading position; a perforating tool movable relative to the plate and thereby relative to the pile of banknotes thereon; a support unit horizontally and vertically movable on the frame for mounting the perforating tool to register the tool, in the horizontal moving of the unit, with given locations of the compressed pile of notes in the working position; and means for repeatedly upwardly moving and downwardly returning the support unit and for actuating the perforating tool to perforate the pile of notes by the tool, at the given locations, in the vertical upward moving of the unit.

2. A machine according to claim 1, in which the plate has means for pulling it to the loading position thereof for receiving the pile of notes to be invalidated and for removal of the invalidated notes, and for pushing it to the working position thereof, for cooperation with the press and perforating tool.

3. A machine according to claim 2, in which the press has a head and a jack for driving it in compressing the pile of notes on the plate when the plate is in the working position thereof.

4. A machine according to claim 1, including a feeler finger horizontally movable with the tool relative to the support unit; and a jig horizontally movable with the support unit relative to the frame, for cooperatively controlling the means for upwardly moving the support unit.

* * * * *